US012415661B2

(12) United States Patent
Xiao

(10) Patent No.: US 12,415,661 B2
(45) Date of Patent: Sep. 16, 2025

(54) STRETCHABLE ASSEMBLY AND STORAGE APPARATUS

(71) Applicant: TAIZHOU SUKK TECHNOLOGY CO., LTD, Taizhou (CN)

(72) Inventor: Shuangshuang Xiao, Taizhou (CN)

(73) Assignee: TAIZHOU SUKK TECHNOLOGY CO., LTD, Taizhou (CN)

( * ) Notice: Subject to any disclaimer, the term of this patent is extended or adjusted under 35 U.S.C. 154(b) by 110 days.

(21) Appl. No.: 18/481,323

(22) Filed: Oct. 5, 2023

(65) Prior Publication Data

US 2024/0417142 A1 Dec. 19, 2024

(30) Foreign Application Priority Data

Jun. 14, 2023 (CN) ........................ 202321516512.4

(51) Int. Cl.

| | |
|---|---|
| ***B65D 43/26*** | (2006.01) |
| ***B65D 25/08*** | (2006.01) |
| ***B65D 25/28*** | (2006.01) |
| ***B67B 7/16*** | (2006.01) |

(52) U.S. Cl.

CPC ............ *B65D 43/26* (2013.01); *B65D 25/08* (2013.01); *B65D 25/2867* (2013.01); *B67B 7/16* (2013.01); *B65D 2543/00833* (2013.01)

(58) Field of Classification Search

CPC .... B65D 43/26; B65D 25/08; B65D 25/2867; B65D 2543/00833; B67B 7/16

USPC ...................................... 220/592.02, 4.03, 8

See application file for complete search history.

(56) References Cited

U.S. PATENT DOCUMENTS 2,990,970 A * 7/1961 Murdock, Sr. .......... F17B 1/007 220/8
5,605,242 A * 2/1997 Hwang ................ B65D 21/086 220/4.03
5,673,360 A * 9/1997 Scripps .................. F24F 6/025 392/401
5,829,591 A * 11/1998 Lyons ................. B65D 21/086 220/8
6,227,397 B1 * 5/2001 Kim .................... B65D 88/121 220/8
7,147,119 B1 * 12/2006 Brothers ............... A47G 19/26 220/8

(Continued)

FOREIGN PATENT DOCUMENTS

CN 116006643 A * 4/2023

*Primary Examiner* — Anthony D Stashick
*Assistant Examiner* — Niki M Eloshway

(57) ABSTRACT

A stretchable assembly and a storage apparatus using the stretchable assembly is provided. The stretchable assembly includes a tube and a rod. The tube includes two limiting holes and a through hole formed at a periphery surface; the rod includes a first end slidably received in the tube. The stretchable assembly further includes two limiting mechanisms and a driving mechanism. The limiting mechanisms are slidably arranged at the first end of the rod and corresponding to the two limiting holes respectively, each of the limiting mechanisms has a first state that the limiting mechanism is inserted in the limiting hole for limiting, and a second state that the limiting mechanism is separated from the limiting hole for releasing the limiting. The driving mechanism is arranged at the first end of the rod and corresponding to the through hole, the driving mechanism is in driving connection with the two limiting mechanisms.

12 Claims, 16 Drawing Sheets

(56) References Cited

U.S. PATENT DOCUMENTS

| | | | | |
|---|---|---|---|---|
| 7,757,888 | B2 * | 7/2010 | Ogura | B60N 3/106<br>220/8 |
| 8,210,380 | B2 * | 7/2012 | Jin | B65F 1/02<br>220/8 |
| 8,789,694 | B2 * | 7/2014 | Roesler | B65D 21/086<br>206/349 |
| 11,737,549 | B2 * | 8/2023 | Cruickshank | A45F 3/44<br>220/8 |
| 2003/0222082 | A1 * | 12/2003 | Sanderson | A63B 71/0036<br>220/8 |
| 2007/0045308 | A1 * | 3/2007 | Lalancette | H02G 3/086<br>220/3.7 |
| 2013/0334220 | A1 * | 12/2013 | Sohler | B65D 21/086<br>220/4.03 |
| 2015/0034636 | A1 * | 2/2015 | Aaland | B65D 25/10<br>220/660 |
| 2016/0107817 | A1 * | 4/2016 | Thornton | B65D 15/06<br>426/119 |
| 2020/0283195 | A1 * | 9/2020 | Falerni | B65D 43/24 |

* cited by examiner

STRETCHABLE ASSEMBLY AND STORAGE APPARATUS

FIELD OF THE INVENTION

The present utility relates to the technical field of stretching structures, and more particularly to a stretchable assembly and a storage apparatus having the stretchable assembly.

BACKGROUND OF THE INVENTION

Stretchable assemblies are common mechanical structures which are used for realizing physical length extension, and the main function of a stretchable assembly needs to ensure that the stretchable assembly can bear a certain axial external force. The stretchable assembly can be applied to a plurality of technical fields, such as a self-timer rod, a robot arm and the like. Taking a storage apparatus, such as ice storage apparatus, or other material storage apparatus that can be opened and closed by a stretchable assembly as an example, traditional stretchable assemblies are usually fixed by screws, pins, or buckles, but these fixed structures are all set on one side of the stretchable assembly, which makes it easy for the stretchable assembly to tilt or get stuck during the stretching process, thus is not stable and smooth enough, finally, leading to the cover on the storage apparatus cannot be opened and closed normally, so as to affect the taking and placing of the objects in the storage apparatus.

SUMMARY OF THE INVENTION

(1) Solved Technical Problem

In order to solve the problems, the invention provides a stretchable assembly and an storage apparatus which are more stable and smooth when the stretching state is switched, and the phenomena of deflection and blockage are not easy to occur.

(2) Technical Solution

To achieve the above purpose, the present invention provides the following technical solution:

The stretchable assembly includes a tube and a rod, wherein the rod is provided with a first end and an opposite second end, the first end of the rod is located inside the tube and is slidably connected to the tube, the second end can be far away or near the tube, a periphery surface the tube, such as any two side surfaces of the tube are provided with limiting holes, and any one side surface is provided with a through hole. The stretchable assembly further includes two limiting mechanisms, and a driving mechanism.

The two limiting mechanisms are slidably arranged at the first end of the rod and corresponding to the two limiting holes respectively, each of the limiting mechanisms has a first state that the limiting mechanism is inserted in the corresponding limiting hole for limiting, and a second state that the limiting mechanism is separated from the corresponding limiting hole for releasing the limiting.

The driving mechanism is arranged at the first end of the rod and corresponding to the through hole, the driving mechanism is in driving connection with both the two limiting mechanisms, thereby when a force is applied on the driving mechanism, the limiting mechanisms can slide and is switched between the first state and the second state.

A storage apparatus using the stretchable assembly is provided. The storage apparatus includes a container having an open end, a cover for covering the open end of the container, wherein the stretchable assembly is installed inside the container; and is vertically arranged and connected to the container with the first end thereof, and connected to the cover with an opposite second end thereof.

(3) Beneficial Effects

Compared with the prior art, the present invention brings the following beneficial effects:

In the actual use process of the stretchable assembly, for the stretchable assembly which has been stretched, the second end of the stretchable assembly is far away from the tube, one end of the driving mechanism is positioned in the through hole, and the limiting mechanism is inserted into the limiting hole so as to fix the relative positions of the tube and the rod. When the stretchable assembly needs to be shortened, an acting force is exerted on the driving mechanism so that one end of the driving mechanism is separated from the through hole, and drive two limit mechanisms to simultaneously detach from the limit hole, at this time, the limit mechanism switches from the first state of limiting to the second state of releasing the limit, allowing the stretchable assembly to be shortened. During its shortening process, the first end of the rod slides within the tube, the second end of the rod is continuously close to the tube. With the above structure, as the limit holes are locate at two sides of the tube and the two limit mechanisms are respectively correspond to the limit holes, the connection mode in the design scheme is more reliable relative to the fixed structure arranged at one side of the stretchable assembly. Concluded from the above, the stretchable assembly is smoother and more stable when the stretching state is switched, and the phenomena of skew and jamming are not easy to occur.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the utility model. In the attached drawings.

Figure 1:
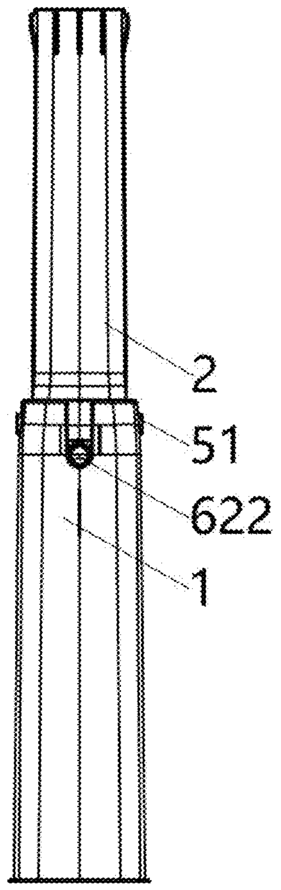
FIG. 1 is a schematic structural view of a stretchable assembly according to an embodiment of the present invention.
Figure 2:
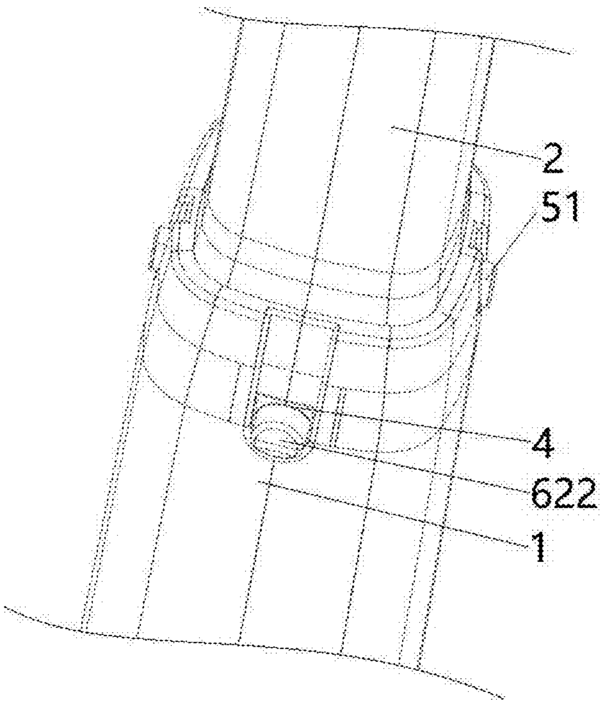
FIG. 2 is a schematic partial view of the stretchable assembly according to the embodiment of the present invention.
Figure 3:
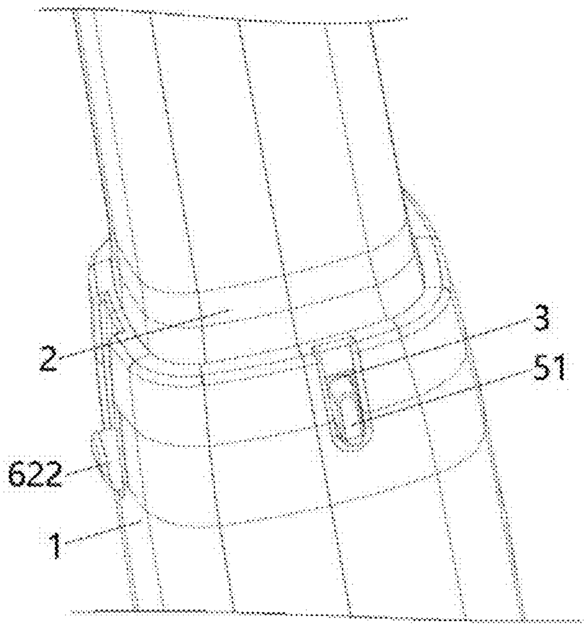
FIG. 3 is another schematic partial view of the stretchable assembly according to the embodiment of the present invention.
Figure 4:
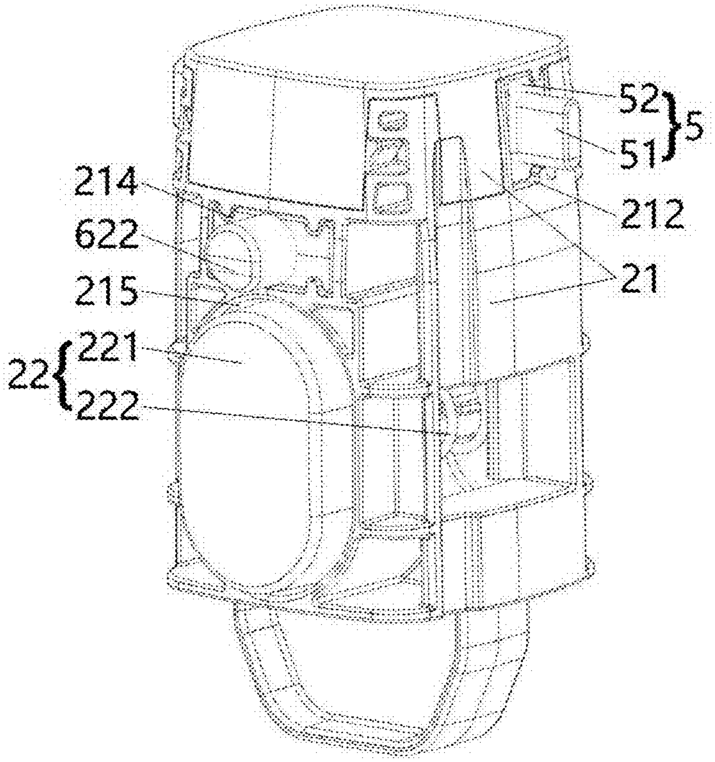
FIG. 4 is a schematic structural view of a first end of a rod according to the embodiment of the present invention.
Figure 5:
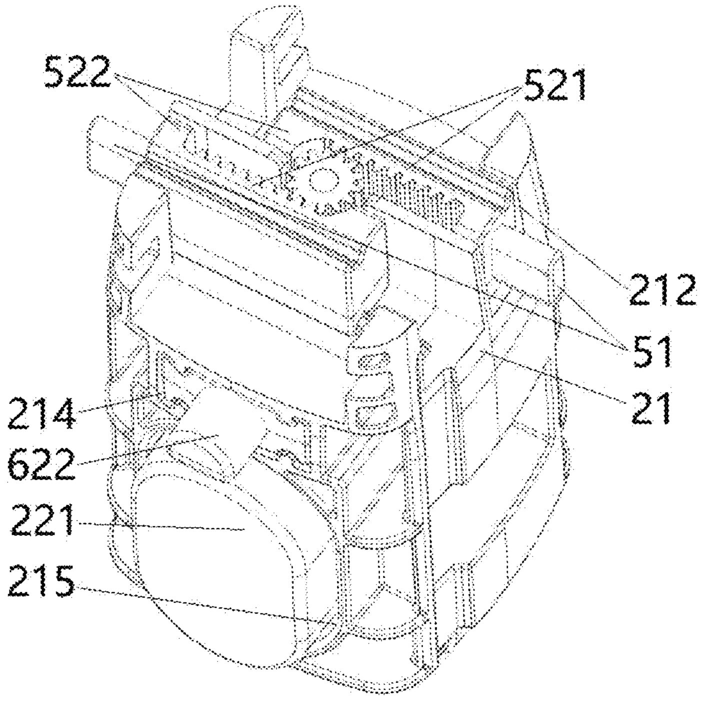
FIG. 5 is another schematic structural view of the first end of the rod according to the embodiment of the present invention.
Figure 6:
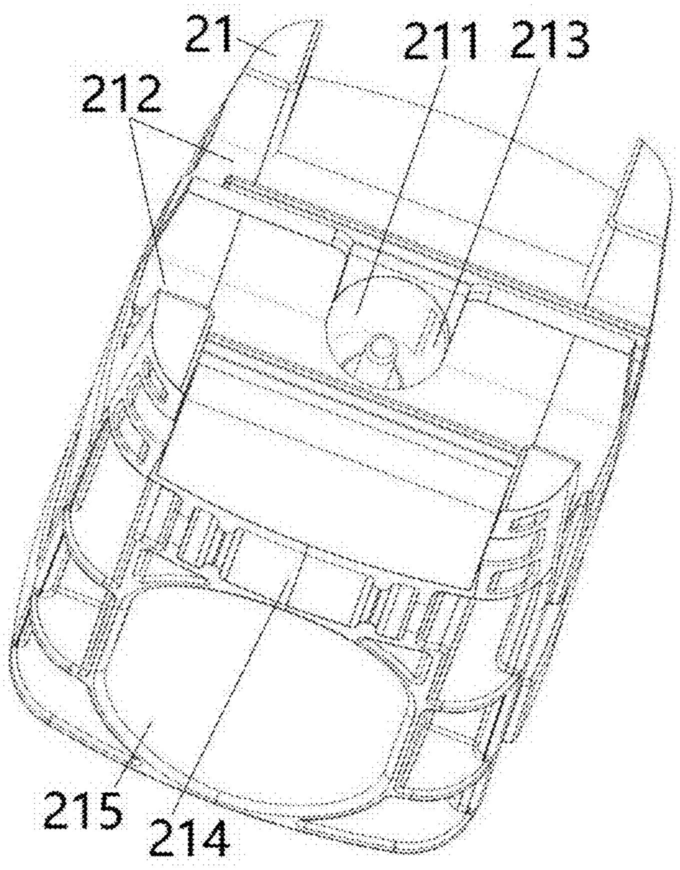
FIG. 6 is a schematic structural view of an installation seat according to the embodiment of the present invention.
Figure 7:
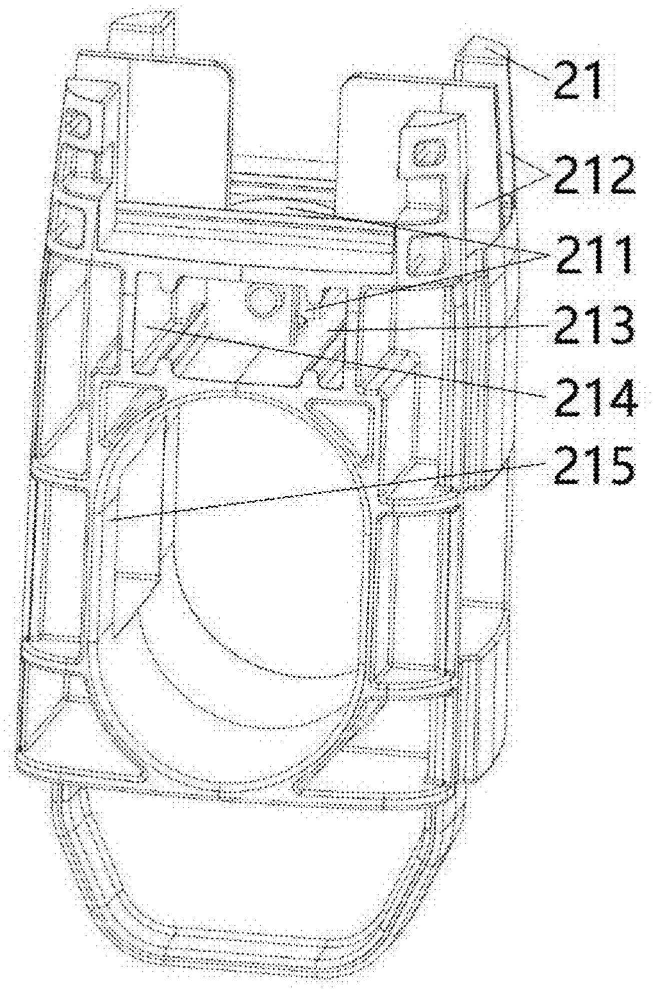
FIG. 7 is another schematic structural view of the installation seat according to the embodiment of the present invention.
Figure 8:
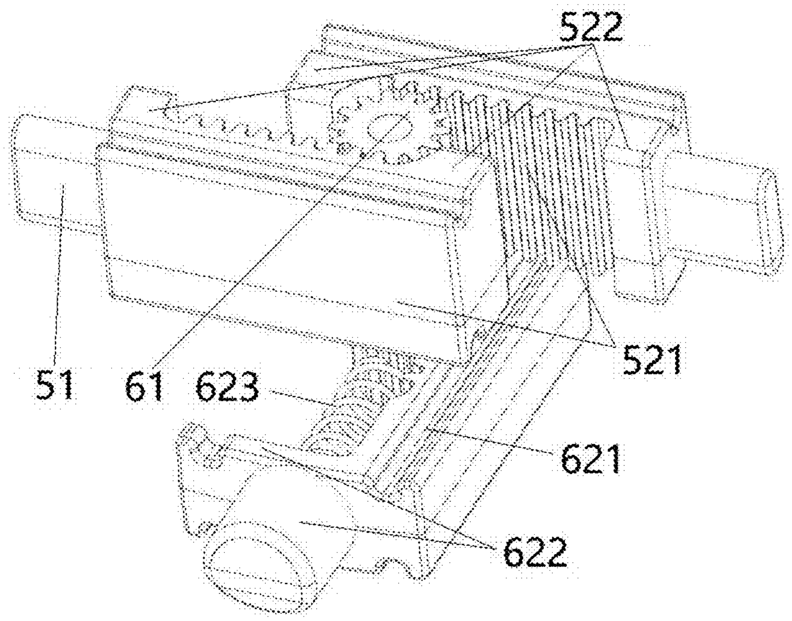
FIG. 8 is a schematic view of a limiting mechanism and a driving mechanism according to the embodiment of the present invention.
Figure 9:
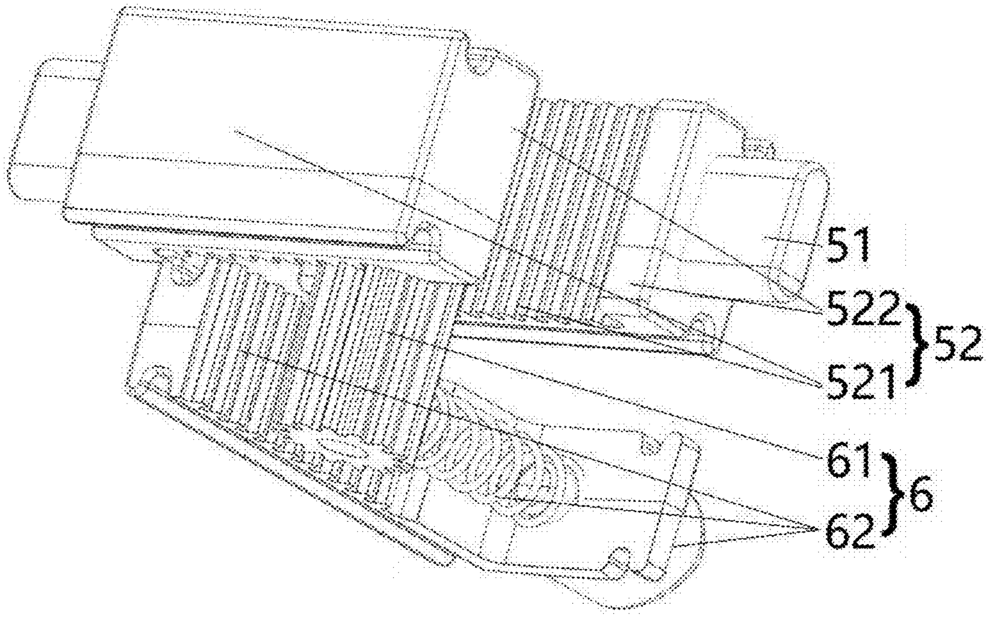
FIG. 9 is another schematic structural view of the limiting mechanism and the driving mechanism according to the embodiment of the present invention.
Figure 10:
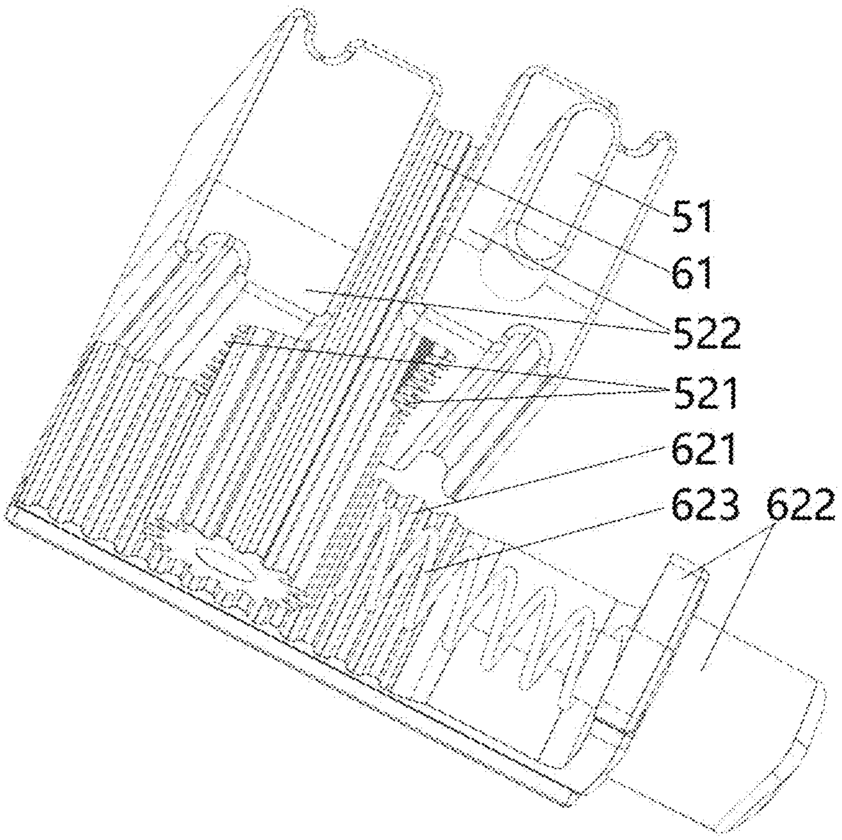
FIG. 10 is further another schematic structural view of the limiting mechanism and the driving mechanism according to the embodiment of the present invention.
Figure 11:
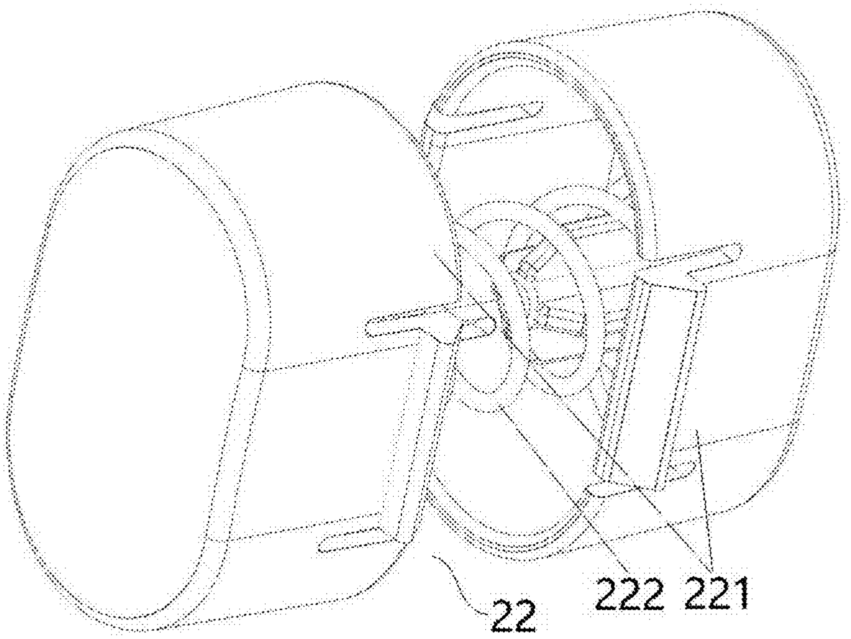
FIG. 11 is a schematic structural view of a damping mechanism according to the embodiment of the present invention.

Labels in the drawings: 1, tube; 2, rod; 21,; 21, installation seat; 211, cavity; 212, a first sliding groove; 213, a second sliding groove; 214, groove; 215, guide hole; 22, damping mechanism; 221, movable member; 222, elastic member; 3, limiting hole; 4, through hole; 5, limiting mechanism; 51, limiting part; 52, connecting part; 521, first gear rack; 522, limiting plate; 6, driving mechanism; 61, gear column; 62, driving member; 621, second gear rack; 622, operating part; 623, elastic reset piece; 7, container; 8, cover; 9, first handle; 10, connecting piece; 11, bottle opener; 12, second handle; 13, storage box; 14, bottle.

DETAILED DESCRIPTION OF PREFERRED EMBODIMENTS

The following description will refer to the accompanying drawings to more fully describe the contents of the present application. It is apparent that here only constitutes a part of the embodiments of the present invention, not all of the embodiments. Based on the embodiments of the present invention, all other embodiments obtained by persons of ordinary skill in the art without making creative efforts belong to the protection scope of the present invention.

Referring to FIGS. 1 to 11, an embodiment of the present invention discloses a stretchable assembly, which includes a tube 1 and a rod 2, wherein the rod 2 is provided with a first end and a second end which are far away from each other, the first end of the rod 2 is positioned inside the tube 1 and is slidably connected with the tube 1, and the second end of the rod 2 can be far away from or close to the tube 1. Any two side surfaces of the tube 1 are provided with limiting holes 3, and any one side surface is provided with a through hole 4. The stretchable assembly further includes two limiting mechanisms 5 and a driving mechanism 6, in particular, the two limiting mechanisms 5 are arranged at the first end of the rod 2 in a sliding manner and are respectively arranged corresponding to the two limiting holes 3. The limiting mechanism 5 also has a first state in which the limiting mechanism 5 is inserted in the limiting hole 3 for limiting and a second state in which the limiting mechanism 5 is separated from the limiting hole 3 to release the limiting. The driving mechanism 6 is installed at the first end of the rod 2 and is arranged corresponding to the through hole 4. The driving mechanism 6 is simultaneously connected with the two limiting mechanisms 5 in a driving manner, and when an acting force is exerted on the driving mechanism 6, the limiting mechanisms 5 can slide and switch between the first state and the second state.

In the actual use process, for the stretchable assembly which has been stretched, the second end of the rod 2 is positioned far away from the tube 1, one end of the driving mechanism 6 is positioned in the through hole 4, and the limiting mechanism 5 is inserted into the limiting hole 3 so as to fix the relative positions of the tube 1 and the rod 2. When the stretchable assembly needs to be shortened, an acting force can be exerted on the driving mechanism 6, so that one end of the driving mechanism 6 is separated from the through hole 4, and drive two limit mechanisms 5 to simultaneously detach from the limit hole 3. At this time, the limit mechanism 5 switches from the first state for limiting to the second state for releasing the limit, allowing the stretchable assembly to be shortened. In this shortening process, the first end of the rod 2 slides within the tube 1, the second end of the rod 2 is continuously close to the tube 1. In the above structure, since the limiting holes 3 are located at two sides of the tube 1 and the two limiting mechanisms 5 are respectively corresponding to the limiting holes 3, this connection mode in the above design scheme is more reliable relative to the fixed structure arranged at one side of the stretchable assembly. Concluded from the above, the stretchable assembly is smoother and more stable when the stretching state is switched, and the phenomena of skew and jamming are not easy to occur.

It should be noted that the specific positions of the limiting holes 3 and the through holes 4 are not limited in the present invention. For example, the two limiting holes 3 can be arranged on two opposite side surfaces of the tube 1, and the through hole 4 is arranged on the surface where one of the limiting holes 3 is located. Of course, there are other various combination embodiments, one of them is selected for introduction in this embodiment, i.e. two limiting holes 3 are arranged on two opposite side surfaces of the tube 1, and the through hole 4 is arranged on one of the other two surfaces of the tube 1. In addition, in order to make the internal structure of the stretchable assembly more reasonable and better solve the stability problems during the stretchable assembly, the two limiting mechanisms 5 in this embodiment are located on the same plane and symmetrically arranged relative to the center of the rod 2, and the sliding directions of the two limiting mechanisms 5 are in reverse.

Based on the above solution, in order to meet the relevant functions of the limiting mechanism 5, the structure of the limiting mechanism 5 is designed as follows. Specifically, the structure includes a limiting part 51 and a connecting part 52. The limiting part 51 can be inserted into or detached from the limiting hole 3; the connecting part 52 is fixedly connected with the limiting part 51, and the connecting part 52 is in driving connection with the driving mechanism 6. Through the design of the above structure, the connecting part 52 can be driven to move by the driving mechanism 6, so that the limiting part 51 can be inserted into or separated from the limiting hole 3.

There are various structures that can meet the driving connection requirements between the connecting part 52 and the driving mechanism 6, but there are fewer solutions that can enable the driving mechanism 6 to simultaneously drive two limit mechanisms 5 to slide in the opposite direction. In this embodiment, the following design has been carried out. Specifically, the connecting part 52 includes a first gear rack 521, the driving mechanism 6 includes a gear column 61, a driving member 62, and the gear column 61 is rotatably mounted at the first end of the rod 2 and engaged with the first gear rack 521. Rotate the gear column 61 can cause two first gear racks 521 to slide in reverse, thereby driving two limiting parts 51 to approach or move away from the gear column 61 at the same time, causing the limit mechanism 5 to switch between the first and second states. The driving element 62 corresponds to the through hole 4 and is in driving connection with the gear column 61.

If the driving member 62 drives the gear column 61 to rotate too far, it may cause the first gear rack 521 to detach from the gear column 61. To avoid this situation, in this embodiment, a limiting plate 522 is installed on the connecting part 52, and there are two limiting plates 522, which are located on the side of the first gear rack 521 facing the driving mechanism 6, which can limit the movement range of the first gear rack 521 and avoid the first gear rack 521 from detaching from the gear column 61.

In order to enable the driving element 62 to drive the gear column 61 to rotate, the following design has been carried out in this embodiment. Specifically, the structure includes a second gear rack 621, and an operating part 622, and the second gear rack 621 is engaged with the gear column 61. The operating part 622 is arranged corresponding to the through hole 4 and is connected to the second gear rack 621.

The main process of how to switch the limit mechanism 5 between the first and second states through the driving mechanism 6 is as follows: applying a force to the operating part 622, the operating part 622 can drive the second gear rack 621 to move, causing the gear column 61 to rotate, and driving the two first gear racks 521 to move in the reverse direction. The limiting part 51 transitions from the first state to the second state, thereby releasing the limit of the limiting part 51 on the tube 1 and the rod 2; then release the force on the operating part 622 and reset the operating part 622, the limiting part 51 transitions from the second state to the first state and limits the tube 1 and rod 2.

The structure designed through the above scheme requires a force to be applied to the operating part 622 when switching between the first and second states of the limit mechanism 5, which is relatively cumbersome. In order to further simplify the operation process, the following design was carried out in this embodiment. Specifically, the driving member 62 also includes an elastic reset piece 623, which is located at the first end of the rod 2, and two ends of the elastic reset piece 623 are fixedly connected to the rod 2 and the operating part 622, enabling the operating part 622 to automatically reset. Through the design of the above structure, when the force on the operating part 622 is relieved, the limit mechanism 5 can automatically return to the first state under the elastic action of the elastic reset piece 623.

In order to enable technical personnel in this field to have a clearer and clearer understanding of how the various components in the above scheme are set up and the connection relationship between them, the above structure is further refined in this embodiment. Specifically, the first end of the rod 2 is equipped with an installation seat 21, and the installation seat 21 is equipped with a cavity 211, a first sliding groove 212, a second sliding groove 213, and a groove 214. The gear column 61 is located inside the cavity 211 and vertically arranged, with one end rotatably connected the installation seat 21. The first sliding groove 212 is connected to the cavity 211 and is slidably connected to the first gear rack 521. The second sliding groove 213 is connected to the cavity 211 and is slidably connected to the second gear rack 621. The second sliding groove 213 is arranged parallel to the first sliding groove 212. The groove 214 is connected to the first sliding groove 212 and is slidably connected to the operating part 622. The elastic reset piece 623 is located inside the groove 214, and both ends are connected to the installation seat 21 and the operating part 622, respectively.

It should be noted that in this embodiment, there is a height difference between the first sliding groove 212 and the second sliding groove 213. The two first sliding grooves 212 are located in the same plane, and the plane where the first sliding groove 212 is located and the plane where the second sliding groove 213 is located are parallel to each other. At the same time, the direction in which the first gear rack 521 moves along the first sliding groove 212 is perpendicular to the direction in which the second gear rack 621 moves along the second sliding groove 213.

The specific operation steps of the stretchable assembly designed through the above structure during the stretching process are as follows: apply a force to the operating part 622, and the operating part 622 can drive the second gear rack 621 to move along the second sliding groove 213, causing the gear column 61 to rotate, and driving the two first gear racks 521 to move in the opposite reversed direction along the two first sliding grooves 212. The limiting part 51 transitions from the first state to the second state. At this time, the elastic reset piece 623 is subjected to force, and the potential energy increases, thereby the limiting part 51 is released from limiting the tube 1 and rod 2. Release the force on the operating part 622, and the limiting part 51 transitions from the second state to the first state, thereby limiting the tube 1 and rod 2.

There is often a gap between tube 1 and rod 2. In order to further enhance the stability of the expansion and contraction process of the expansion and contraction rod and prevent the expansion and contraction process from being too fast, the following design has been carried out in this embodiment. Specifically, the installation seat 21 is equipped with a guide hole 215, and the stretchable assembly further includes a damping mechanism 22 for increasing the sliding friction force between tube 1 and rod 2. The damping mechanism 22 includes a movable member 221 and an elastic member 222, and the movable member 221 has two, and the two movable members 221 are set opposite to each other, and side sliding connection with guide hole 215. The two ends of the elastic member 222 are respectively connected to two movable members 221, so that both movable members 221 can abut the tube 1. The design of the above structure can effectively enhance the stability of the stretchable assembly during the expansion and contraction process, prevent the rod 2 from shaking back and forth, and prevent the rod 2 from extending or retracting tube 1 too quickly.

Figure 12:
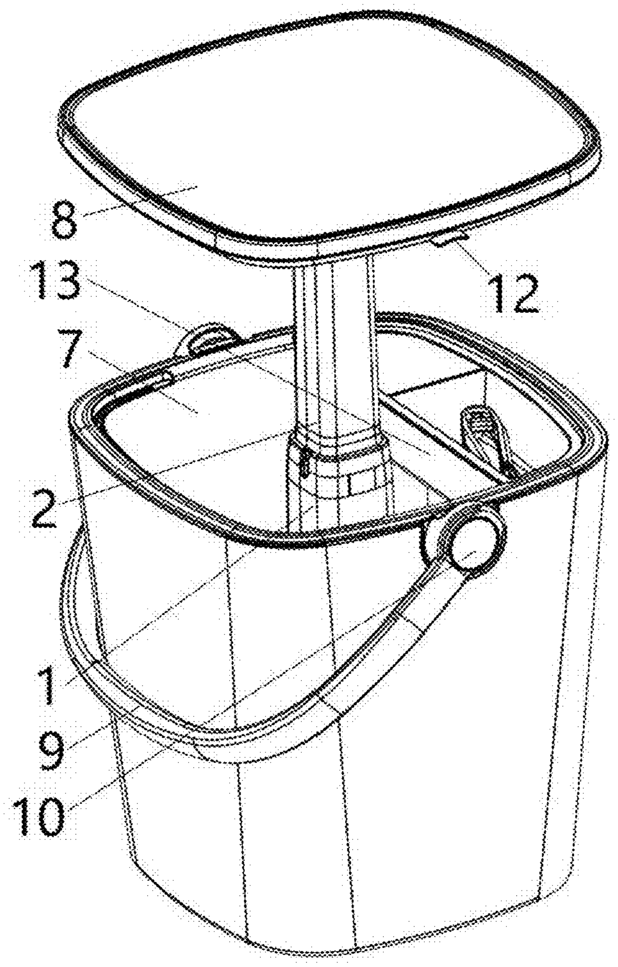
FIG. 12 is a schematic structural view of a storage apparatus when a cover is open according to the embodiment of the present invention.
Figure 13:
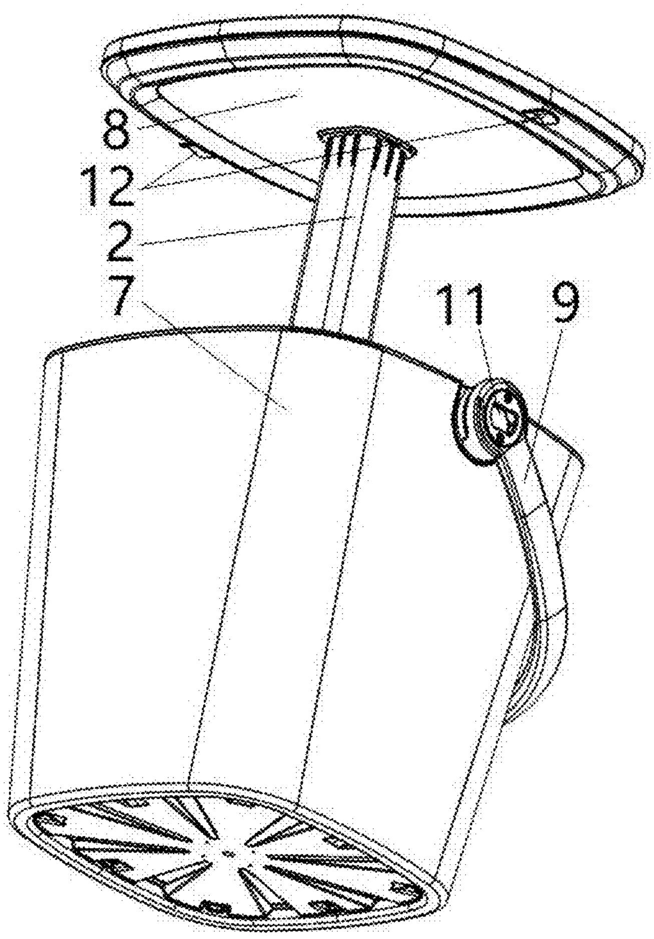
FIG. 13 is another schematic structural view of a storage apparatus when a cover is open according to the embodiment of the present invention.
Figure 14:
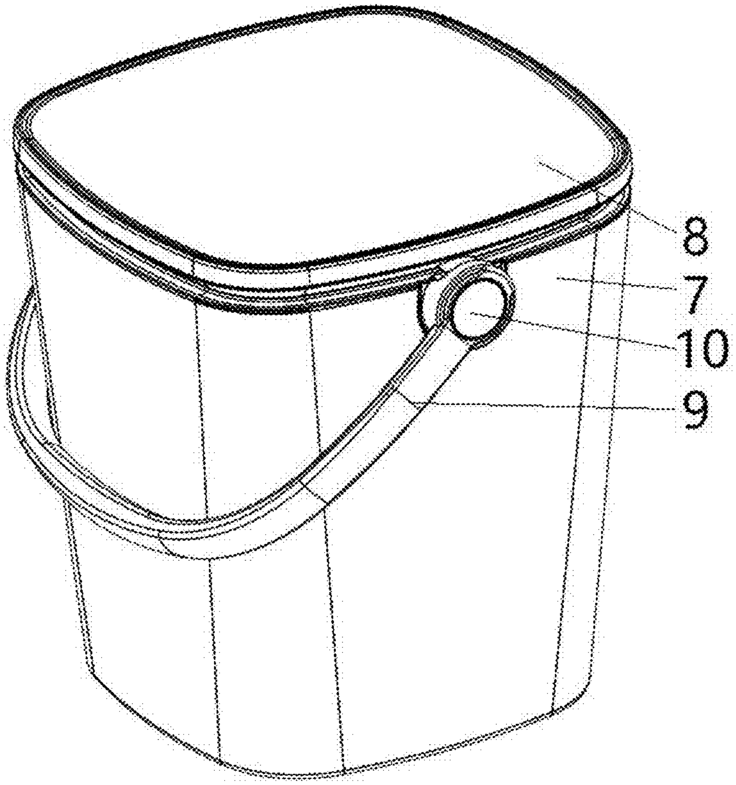
FIG. 14 is a schematic structural view of a storage apparatus when the cover is closed according to the embodiment of the present invention.
Figure 15:
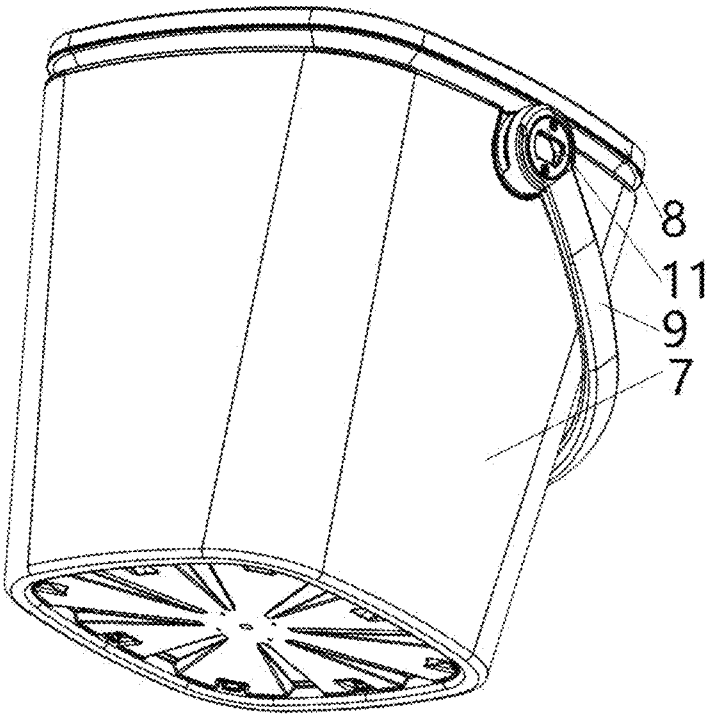
FIG. 15 is another schematic structural view of a storage apparatus when the cover is closed according to the embodiment of the present invention.
Figure 16:
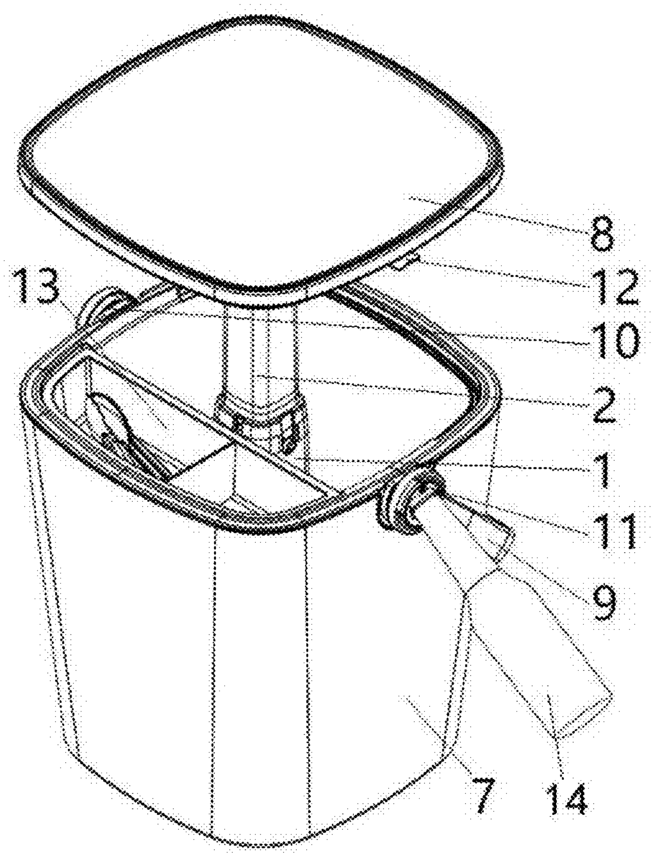
FIG. 16 is a schematic structural view of a bottle opener opens a cap of a bottle according to the embodiment of the present invention.

Referring to FIGS. 12 and 16, the embodiment of the present invention also discloses a storage apparatus made of the aforementioned stretchable assembly, and the storage apparatus can store ice, or other materials. The storage apparatus includes a container 7 having an open end, and a cover 8 for covering the open end of the container 7. The container 7 is in a can body shape, a tin body shape, or in a barrel body shape, and is internally equipped with the above stretchable assembly, which is vertically arranged and connected to the container 7 with the first end thereof, and connected to the cover 8 with the opposite second end.

The storage apparatus further includes a first handle 9 for lifting the container 7. The two ends of the first handle 9 are rotationally connected to the connecting pieces 10, which are arranged opposite to each other, and detachably connected to the container 7. At least one of the connecting pieces 10 can be detachably connected to a bottle opener 11, the bottle opener 11 can open a cover of a bottle 14. The storage apparatus further includes a second handle 12 for opening the cover 8, and the second handle 12 is located on the cover 8. In addition, a storage box 13 for storing ice or other materials can be detachably connected inside the container 7.

During use, the connecting piece 10 allows the first handle 9 to rotate, making it easy to lift the container 7 through the first handle 9. Then, the container 7 is placed somewhere, and the cover 8 can be opened upwards through the second handle 12. The stretchable assembly can support the position of the cover 8. The bottle opener 11 on the connecting piece 10 can be used to open the bottle caps, such as the caps on beer bottles, and the storage box 13 placed inside the container 7 can store items such as ice cubes or tweezers.

Although embodiments of the present invention have been shown and described, it can be understood by ordinary technical personnel in the art that multiple changes, modifications, substitutions, and variations can be made to these embodiments without departing from the principles and spirit of the present invention. The scope of the present invention is limited by the accompanying claims and their equivalents.

What is claimed is:

1. A stretchable assembly comprising:

a tube comprising two limiting holes and a through hole formed at a periphery surface thereof;

a rod comprising an end slidably received in the tube;

two limiting mechanisms slidably arranged at the end of the rod and corresponding to the two limiting holes respectively, each of the limiting mechanisms having a first state that the limiting mechanism is inserted in the corresponding limiting hole for limiting, and a second state that the limiting mechanism is separated from the corresponding limiting hole for releasing the limiting; and a driving mechanism arranged at the end of the rod and corresponding to the through hole, the driving mechanism being in driving connection with both the two limiting mechanisms, thereby when a force is applied on the driving mechanism, the limiting mechanisms can slide and be switched between the first state and the second state;

wherein the two limiting holes are arranged on two opposite side surfaces of the tube, the two limiting mechanisms are positioned on a same plane and symmetrically arranged relative to a center of the rod, and sliding directions of the two limit mechanisms are opposite;

each limiting mechanism comprises: a limiting part configured to be inserted into or detached from the limiting hole and a connecting part fixedly connected with the limiting part, wherein the connecting part is in driving connection with the driving mechanism and comprises two first gear racks; and the driving mechanism comprises a gear column rotatably arranged at the end of the rod and engaged with the first gear racks and a driving member arranged corresponding to the through hole and in driving connection with the gear column, wherein by rotating the gear column, the two first gear racks can slide reversely, so that the two limiting parts are driven simultaneously to be close to or simultaneously to be far away from the gear column, thus the limiting mechanism is switched between a first state and a second state.

2. The stretchable assembly according to claim 1, wherein the connecting part further comprises two limiting plates arranged on one side of the first gear rack facing the driving mechanism and configured for limiting the moving range of the first gear rack.

3. The stretchable assembly according to claim 1, wherein the driving member comprises:

a second gear rack engaged with the gear column;

an operating part arranged corresponding to the through hole, and in connection with the second gear rack;

when an acting force is exerted on the operating part, the operating part can drive the second gear rack to move, so that the gear column is rotated, and the two first gear racks are driven to move reversely, thus the limiting part is switched from a first state to a second state, and the limiting part is released from limiting the tube and the rod;

when the acting force on the operating part is released, the operating part is reset, the limiting part is switched from the second state to the first state, and the tube and the rod are limited.

4. The stretchable assembly according to claim 3, wherein the driving member further comprises an elastic reset piece, the elastic reset piece is positioned at the end of the rod, and two ends of the elastic reset piece are fixedly connected with the rod and the operating part respectively, so that the operating part can be automatically reset.

5. The stretchable assembly according to claim 4, wherein the end of the rod is equipped with an installation seat, and the installation seat comprises:

a cavity, the gear column being located inside the cavity and vertically arranged, with one end thereof rotatably connected the installation seat;

a first sliding groove in communication with the cavity and being slidably connected to the first gear rack;

a second sliding groove in communication with the cavity and being slidably connected to the second gear rack, the second sliding groove being arranged parallel to the first sliding groove; and a groove in communication with the first sliding groove and being slidably connected to the operating part, the elastic reset piece being located inside the groove, with both ends thereof are connected to the installation seat and the operating part, respectively;

when apply a force to the operating part, the operating part can drive the second gear rack to move along the second sliding groove, causing the gear column to rotate, and driving the two first gear racks to move in reverse directions along the two first sliding grooves, thus the limiting part is switched from the first state to the second state, and the elastic reset piece is subjected to force simultaneously, and the thus potential energy increases, thereby the limiting part is released from limiting the tube and rod;

when the force on the operating part is released, the limiting part is switched from the second state to the first state, thereby limiting the tube and rod.

6. The stretchable assembly according to claim 5, wherein the installation seat comprises a guide hole, and the stretchable assembly further comprises a damping mechanism for increasing the sliding friction force between tube and rod, the damping mechanism comprises:

two movable members arranged opposite to each other, and having a side slidably connected with guide hole; and an elastic member, two ends of the elastic member being respectively connected to two movable members, so that both the movable members can abut the tube.

7. A storage apparatus comprising:

a stretchable assembly according to claim 1;

a container having an open end, and a cover for covering the open end of the container, wherein the stretchable assembly is installed inside the container; and is vertically arranged and connected to the container with a first end thereof, and connected to the cover with an opposite second end thereof.

8. The storage apparatus according to claim 7, wherein the container is in a can, a tin or a barrel shape, the storage apparatus further comprises a first handle for lifting the container, two ends of the first handle being rotationally connected to two connecting pieces arranged opposite to each other, and the connecting pieces detachably connected to the container.

9. The storage apparatus according to claim 8, further comprising a second handle configured for opening the cover, the second handle being located on the cover.

10. The storage apparatus according to claim 8, wherein at least one of the connecting pieces has a bottle opener detachably connected thereon.

11. The storage apparatus according to claim 8, the container comprises a storage box detachably connected therein, and the storage box is configured for storing ice cubes.

12. An ice storage apparatus comprising:

a stretchable assembly according to claim 1;

a container configured for containing ice, the container having an open end, and a cover for covering the open end of the container, wherein the stretchable assembly is installed inside the container; and is vertically arranged and connected to the container with a first end thereof, and connected to the cover with an opposite second end thereof.

* * * * *